April 12, 1966 C. A. HUGGINS ETAL 3,245,669
CONTACT APPARATUS
Filed April 8, 1964 3 Sheets-Sheet 1
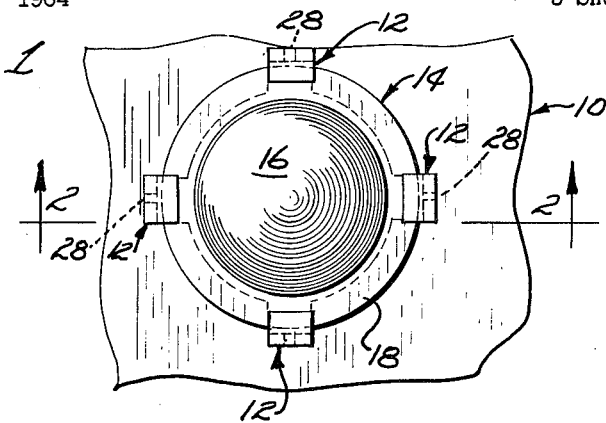
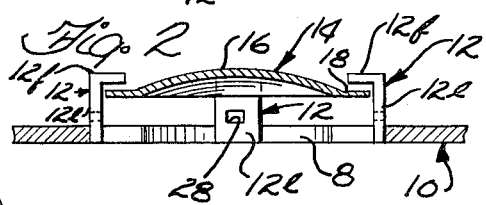
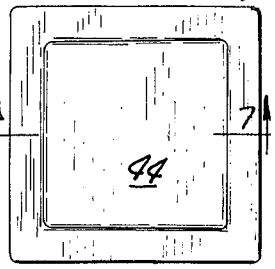
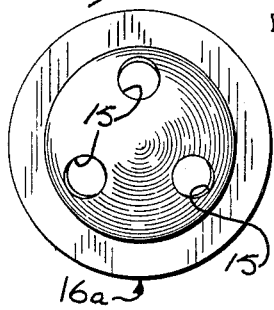
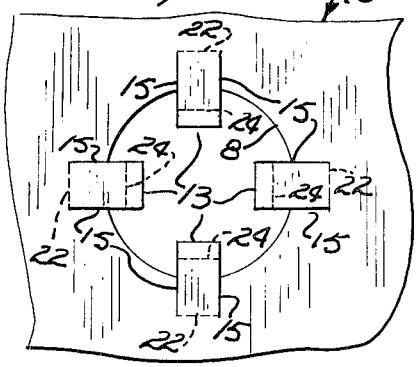
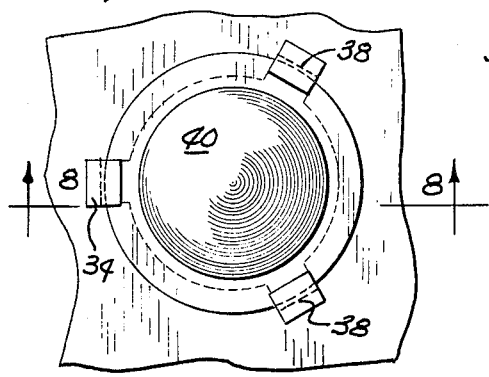
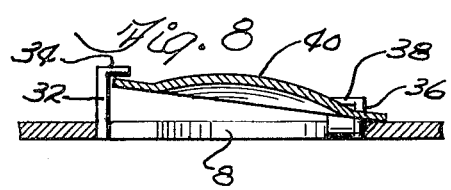
INVENTOR.
Clifford A. Huggins
Griffin C. Thrift
BY Pendleton, Neumans
Seibold & Williams
Att'ys April 12, 1966  C. A. HUGGINS ET AL  3,245,669
CONTACT APPARATUS Filed April 8, 1964  3 Sheets-Sheet 2

INVENTOR.
Clifford A. Huggins
Griffin B. Thrift
BY Pendleton, Neuman,
Seibold & Williams
Attorneys April 12, 1966  C. A. HUGGINS ETAL  3,245,669
CONTACT APPARATUS
Filed April 8, 1964  3 Sheets-Sheet 3
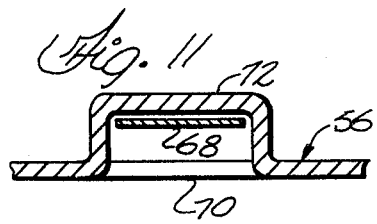
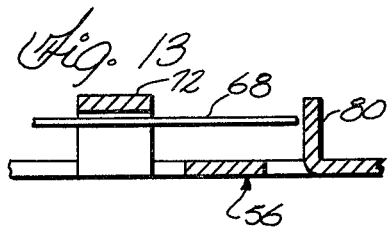
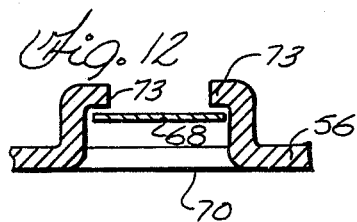
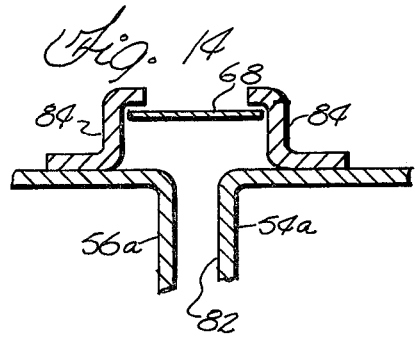
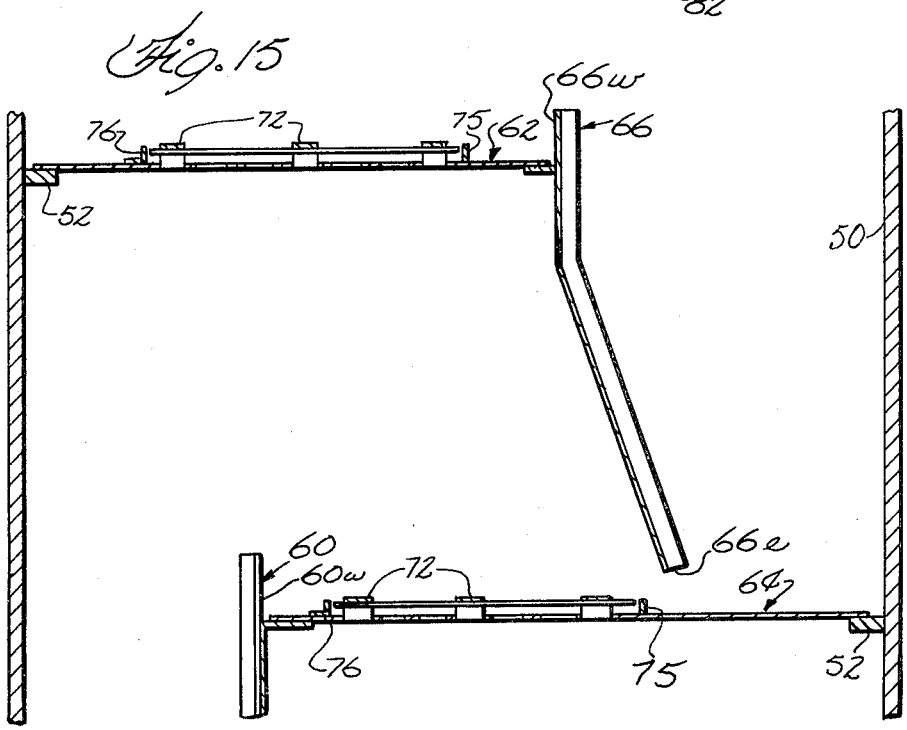
INVENTOR.
Clifford A. Huggins
Griffin B. Thrift
BY
Pendleton, Nauman,
Seibold & Williams
Attorneys

United States Patent Office 3,245,669
Patented Apr. 12, 1966

3,245,669
CONTACT APPARATUS
Clifford A. Huggins and Griffin C. Thrift, Wichita, Kans., assignors to Koch Engineering Company, Inc., Wichita, Kans., a corporation of Kansas
Filed Apr. 8, 1964, Ser. No. 359,549
11 Claims. (Cl. 261—114)

This application is a continuation-in-part of our copending application Serial No. 300,257, filed August 6, 1963 now abandoned, which is a division of our copending application Serial No. 613,898, filed October 4, 1956, the latter application being a continuation-in-part of application Serial No. 414,578, now Patent No. 2,772,080.

This invention pertains to an improved contact apparatus, and more particularly relates to contact apparatus in which a valve closure member is retained to an apertured deck therein by means of novel retaining means formed integrally with the deck.

The prior art is replete with check valve constructions for use in absorbers, rectifiers, dephlegmators and apparatus of this general type in which contact between gases or vapors and liquids, or liquids and liquids, is to be effected. However, all of these valve constructions are subject to one or more serious objections which greatly limit their usefulness.

Some check valve constructions are so bulky as to seriously retard the movement of liquid across and through a deck thereby creating hydraulic gradients across the surface thereof and other undesirable problems. Others are complicated in details of construction and require a large expenditure in time and labor to secure parts thereof to the deck. It is believed that the constructions hereinafter disclosed are the most advanced of their type and are particularly desirable where the tower capacity is moderate, but maximum flexibility is required.

Many check valves employed in contact apparatus are of complex structure and design to enable the same to function in a specific, desired manner. Such valves, because of their complexity of structure, necessitate the expenditure of great amounts of time and labor in the course of initial assembly and replacement. Consequently, valve assembly to a deck member normally entails the utilization of tools of various kinds which are manipulated only with difficulty. In addition, the complex structure renders periodic cleaning extremely difficult, particularly where dirty fluid phases are being processed in the contact apparatus. Still further, the complexity of structure of many known check valves renders the same efficiently operable, only under limited vapor loadings in the contact apparatus in which disposed.

It is an object of this invention to provide novel valved plate or deck constructions for use in contact apparatus, which are inexpensive to manufacture, simple in details of construction, and efficiently operable over broad ranges of vapor loadings.

It is another object of this invention to provide a contact apparatus deck construction wherein the means retaining the valve members to the deck are formed integrally with the deck, thereby dispensing with attaching operations necessary when discrete valve-retaining means are employed.

It is a further object of this invention to provide a valved deck construction in a contact apparatus wherein the retention means securing the valves to the deck afford minimum resistance to fluid flow across and through the deck, thereby obviating the creation of a hydraulic gradient across the deck in the normal course of apparatus operation and other undesirable effects.

It is another object of this invention to provide a contact apparatus deck construction in which valve members and valve-retaining members may be readily replaced, adding to the apparatus life and efficiency, as will hereinafter be explained in greater detail.

The above and other objects of this invention will become apparent from a study of the following detailed disclosure when read in the light of the accompanying drawing and the appended claims.

In one embodiment of this invention a contact apparatus is provided having disposed therein a plurality of superposed, perforated plates or decks in which valve-retaining means are integrally formed with portions of the deck. The retaining means preferably comprise strips which extend from deck portions defining the apertures through which the fluid media which interengage pass. The strips comprise substantially vertical leg portions integrally formed at their lower end portions with the deck aperture-defining peripheries and at their upper end portions with foot-like stop portions inwardly extending toward a vertical axis passing through the center of the underlying deck aperture. The leg portions of the retaining means define the height to which the valves may rise above the deck apertures; the foot portions function as stops limiting the valve movement.

In the normal course of deck formation, portions thereof are stamped out leaving a plurality of converging strips extending from peripheral portions of the deck defining an opening therein. The strips are integrally formed with the deck at bending axes set in from the periphery of a partially-formed aperture about which disposed. The strips are able to be bent along the bending axes into a substantially right-angle relationship and deck surface portions set in from the aperture periphery because of shear lines separating the strip longitudinal edge portions from the deck surface. The shear lines extend from the periphery of the partially-formed deck aperture to the bending axes or junctures between the strips and deck. After bending into substantially right-angle relationship with the deck, valve members having areas approximating that of the deck openings are placed on the deck. Although the area of each valve is normally greater than that of the underlying opening, it may be less than that of the opening and provide for direct vapor passage through the opening at all times. Distal end portions of the strips may then be inwardly bent toward a vertical axis passing through the deck aperture center so as to form vertical leg portions defining the extent of valve movement from the deck and stop foot members serving to stop the valves at the end limit of their upward travel.

In an alternate construction embodying the principles of the invention herein disclosed, elongate slat-like valve members are each disposed over a plurality of spaced, axially-aligned openings formed in a contact apparatus deck. Movement of the slat valves in the vertical plane relative to the deck surface is controlled by hold-downs formed integrally with the deck by shearing and forming steps. The hold-downs may comprise continuous narrow strips stretched and pressed out from the main deck surface. If the deck thickness is so great as to prevent desired stretching of the sheared strips into the form of a continuous hold-down, opposed angle-like members having distal ends spaced apart over the center of the underlying slat valve may be formed integrally with the deck as hold-downs.

Longitudinal movement, or movement of the slat valves parallel to the deck surface and the valve longitudinal axes is controlled by retaining means projecting from the deck surface a sufficient height so as to engage the ends of the slat valves regardless of the positions in which disposed.

The retaining means may comprise angle irons bolted to the deck surface. One of the retaining means may comprise a vertically-disposed strip welded in place on the deck surface; the retaining means oppositely disposed thereto should be readily removable, however, to facilitate valve replacement, as will hereinafter be explained in greater detail.

For a more complete understanding of this invention, reference should now be had to the drawings, wherein:

FIGURE 1 is a fragmentary top plan view of a valve closure member and apertured deck in which the deck has valve closure member retaining means formed integrally therewith;

FIG. 2 is a sectional view taken on line 2—2 of FIG. 1;

FIG. 3 is a fragmentary top plan view of a portion of an apertured deck blank prior to formation of closure member retaining means;

FIG. 4 is a top plan view of a modified valve closure member;

FIG. 5 is a top plan view of a valve closure member utilized in conjunction with a deck member having three retaining legs of varying height formed integrally therewith;

FIG. 6 is a top plan view of a modified closure member;

FIG. 7 is a sectional view taken on line 7—7 of FIG. 6;

FIG. 8 is a sectional view taken on line 8—8 of FIG. 5;

FIG. 11 is a fragmentary enlarged transverse sectional view illustrating a hold-down for a slat-like valve, said hold-down being extruded from the deck surface with which integrally formed;

FIG. 12 is a fragmentary transverse sectional view illustrating a modified type of hold-down construction which may be formed integrally with a deck, the opposed valve-retaining portions of the hold-down being discontinuous;

FIG. 13 is a fragmentary longitudinal view illustrating a slat-like valve member arranged in combination with a deck member having a valve hold-down and valve-retaining means formed integrally with the deck;

FIG. 14 is a fragmentary transverse sectional view illustrating a slat-like valve member in combination with opposed hold-down members straddling the junction between two deck sections; and FIG. 15 is a fragmentary sectional view of a contact apparatus employing the slat-like valves of FIG. 9 illustrating a downcomer arrangement between two deck members.

Figure 9:
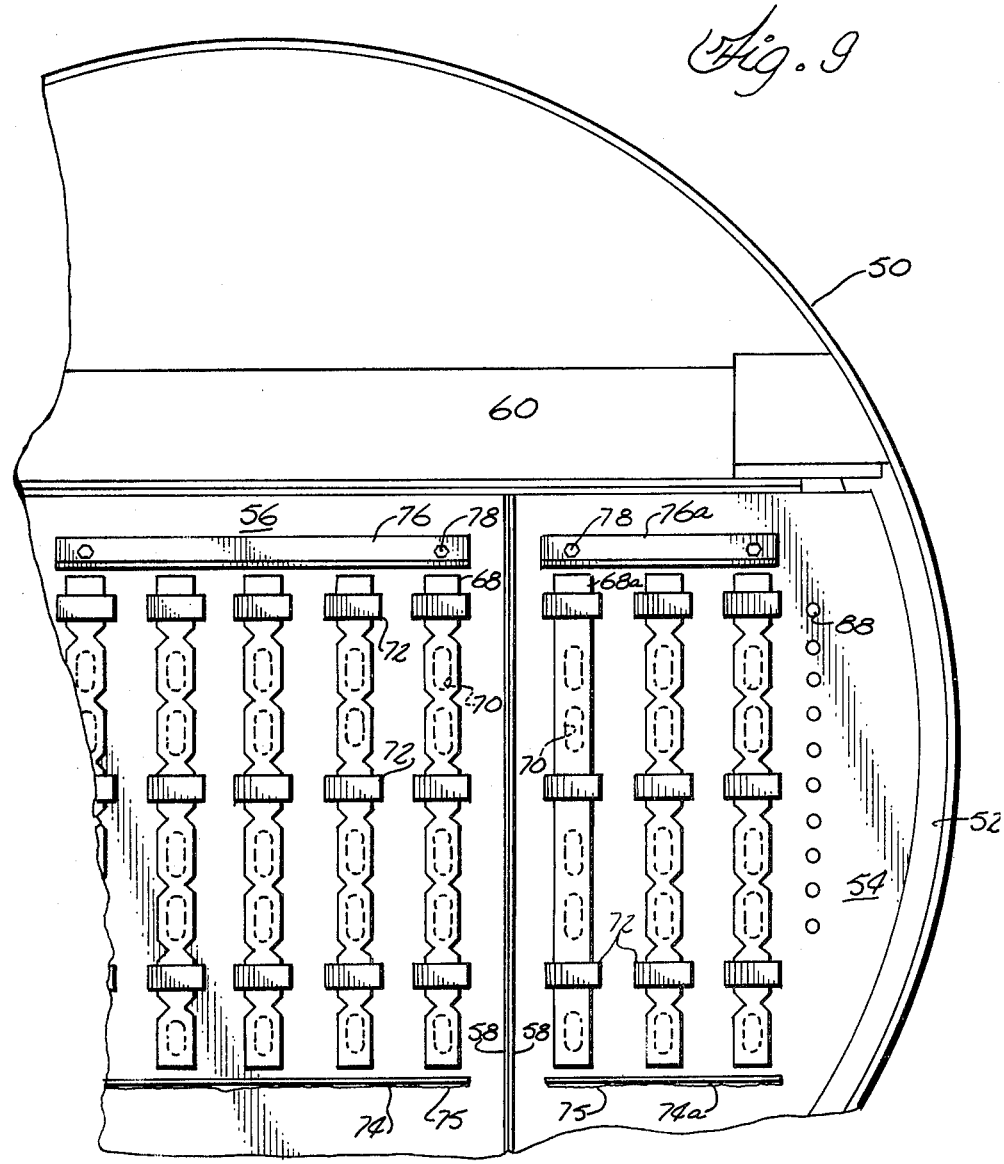
FIG. 9 is a fragmentary top plan view of an apertured deck construction illustrating slat-like valve members maintained in fixed position on the apertured deck surface by means of hold-downs formed integrally with the deck and valve-retaining means secured to the deck surface.

Referring now more particularly to FIG. 1 of the drawing, a fragment of an apertured deck 10 is illustrated having disposed therein a plurality of spaced apertures, such as aperture 8 illustrated in FIG. 2. The apertured deck enables a rising fluid medium, such as a vapor, to pass through the apertures in the course of countercurrently engaging a descending fluid medium, such as condensed vapors passing from the deck above.

It is usual in contact apparatus of the type illustrated to employ downcomers, or other equivalent means, with each deck to maintain a predetermined desired liquid level on the deck surface in the normal course of apparatus operation. By projecting above and below the deck on which disposed, and by staggering the arrangement of the downcomers on successive decks, the liquid is forced to reach a certain height on the deck before entering the downcomer opening. Thus, the liquid will move across the deck surfaces in opposite directions on successive decks because of the staggered downcomer arrangement.

As is seen from FIG. 2, spaced retaining members 12 which serve to retain reciprocally movable valve 14 to deck 10 are integrally formed with the deck. Each retaining member 12 comprises a vertical leg portion 12l, the length of which determines the height that the valve 14 may rise from the surface of deck 10.

The distal end limit of each retaining member 12 is formed integrally with a closure member-retaining foot portion 12f. Each foot 12f projects toward a vertical axis passing through the center of the underlying aperture 8 formed in the deck or plate member 10 through which rising vapors pass in the course of countercurrently engaging liquids disposed on the plate.

At low vapor loadings the peripheral portions of the deck 10 defining the aperture 8 support the concavo-convex disc 14 which functions as the valve closure member. The latter disc has a raised central portion 16 and a flat annular peripheral portion 18, which engages the deck portions defining the aperture 8 when the closure member 14 rests on the deck 10. It is apparent that in the normal course of apparatus operation, after the passage of a certain minimum vapor pressure through the deck aperture 8, the closure disc 14 will be raised from the deck to the maximum height allowed by the height of the leg portions 12l.

The simplicity of construction of the check valve construction retaining means is apparent from FIG. 3. In a simple blanking operation, the deck 10 may have a portion thereof punched out so as to define a portion of the partially-formed deck aperture 8. Simultaneously with the latter operation, retaining strips 13 are formed which have proximal lateral edge portions sheared from engagement with the adjacent deck portions along lines 15. Because of the latter shear lines, each of the retaining strips 13 may be bent following the blanking operation into retaining members 12 having leg portions 12l extending from innermost portions of indentions 20 (see FIG. 2) and foot portions 12f.

These latter check valve-retaining portions may be readily formed by bending along the bending axes illustrated as dotted lines 22 and 24, respectively, in FIG. 3. Thus, upon bending the proximal end portion of each retaining strip 13 along the dotted line 22 illustrated in FIG. 3, an erect leg portion 12l is formed. A projecting foot portion 12f, illustrated in FIG. 2, may then be formed by bending strip 13 along line 24 illustrated in FIG. 3. It is apparent that preliminarily to bending along dotted lines 24 and forming the retaining foot portions 12f, the closure disc 14 should be inserted between the erect leg portions so that it may be locked between the retaining means following the formation of the foot portions 12f.

It is believed apparent that the method of contact apparatus fabrication above described is most economical and efficient, since the most efficient use is made of the materials of composition with a minimum expenditure of time and labor.

If it is desired to disperse a portion of the rising vapors directly through the check valve, apertures 15 of check valve closure member 16a, illustrated in FIG. 4, may be employed. Also, apertures 28 may be disposed in leg members 12l, as illustrated in FIGS. 1 and 2, to facilitate fluid flow across the deck, and particularly where solid particles are entrained in the fluid.

The number of retaining legs may, of course, be varied in different deck constructions. The construction of FIG. 5 illustrates three retaining members disposed about an enclosed check valve closure member 40.

Since the valve-retaining legs and foot portions are in a permanent position by virtue of their integral formation with a deck member, the height of the individual leg members above the deck surfaces may vary. Thus, a valve closure member will be canted into a predetermined planar disposition upon being raised from its seat portion into the uppermost valve position, which is dictated by the relative positions of the foot portions or stops of the various retaining members.

Referring to FIGS. 5 and 8, it will be noted that leg portion 32 illustrated in FIG. 8 and formed integrally with a foot portion 34 is of a greater height than the two opposed leg portions 36 having foot portions 38 formed integrally therewith. Consequently, the valve portions 38 formed integrally s
integrally therewith. Consequently, the valve closure disc 40, which is illustrated, will always be upwardly canted when in the fully raised position in the direction of the longer retaining leg 32. Thus, fluid flow across a deck surface may be assisted by a predetermined arrangement of the retaining leg and foot portions which enables the valve disc closure members to be canted toward the fluid outlet of the deck. The primary direction imparted to the vapors impinging against the under-surfaces of the various closure members will be toward the deck fluid outlet and thus fluid flow will be assisted.

FIGS. 6 and 7 illustrate a valve 42 which is of rectilinear peripheral configuration. The raised head portion 44 is formed therein for reinforcing purposes and imparting resistance to bending or twisting. The aperture over which such a valve closure member would normally be disposed is preferably of a rectilinear peripheral configuration. Such a valve closure member may also be obviously used with retaining leg portions of varying height, whereby the gases rising through the deck will be forced to primarily move in a predetermined direction across the deck, and fluid flow on the deck will thus be accordingly assisted.

Referring now more particularly to FIGS. 9 through 15, a modified valve construction is therein illustrated which is of elongate slat-like configuration. Referring to FIG. 9, a contact apparatus shell 50 is illustrated which supports, by means of an internal supporting ledge 52, deck sections 54 and 56. Each deck section is supported on a peripheral portion of ledge 52 of the shell 50 and retained thereto by means of clamp arrangements well known in the art. Defining a longitudinal edge of each section 54 and 56 is raised flange 58. Secured to the end edges of each section 54 and 56 is a depending downcomer 60 which is outwardly bent away from the deck sections 54 and 56.

Referring to FIG. 15, it will be noted that superposed decks 62 and 64 are illustrated in combination with downcomers 66 and 60. A descending heavier fluid phase which passes over the top of weir portion 66w of downcomer 66, descends by means of the downcomer to underlying deck 64. Upon reaching the deck 64, the fluid flows in the opposite direction over weir 60w prior to entering downcomer 60 and proceeding to the underlying deck. By use of the staggered downcomer and deck arrangement, the descending heavier fluid is forced to reverse movement on consecutive decks in the course of flowing from deck to downcomer.

It will also be apparent from FIG. 15 that terminal end 66e of downcomer 66 lies below the level of weir 60w. As a result, sufficient heavier fluid phase accumulates on deck 64 so as to retain the terminus of downcomer 66e submerged. Thus, a seal pan is formed by means of the weir 60w in combination with a peripheral shell portion which prevents direct vapor passage through the deck 64 up the downcomer 66.

Also, the formation of a liquid level on deck 64 prevents a heavier fluid phase from passing directly into an aperture of deck 64. The use of the weir 60w in combination with the downcomer 66 thus obviously functions to effect a method of operation well known in contact apparatus of this type, which assures desired intimate contact between the rising, lighter fluid phase and the descending heavier fluid phase.

Referring again to FIG. 9, it will be noted therein that a plurality of elongate slat members 68 and 68a are arranged in parallel relationship across the deck sections 56 and 54, respectively, in which they are disposed. The slat-like valves are disposed over deck apertures 70 which are maintained in alignment so that a single valve may cover a plurality of the aligned deck openings 70. Retaining the slat-like valve members to the deck sections on which disposed are hold-downs 72 formed integrally with the deck sections.

Referring to FIG. 11, a sectional view is therein illustrated depicting the manner whereby the hold-down 72 is formed or extruded from the deck section 56, of which it comprises an integral part. In the normal course of hold-down formation, parallel slots are cut through the tray thickness, after which the cut strips are urged uniform distances from the deck surface so as to form the raised inverted U-shaped members 72 which function as valve hold-downs, as illustrated in FIG. 11. It has been found that metal from which deck sections are normally formed is capable of being extruded the desired distances which the overlying valve members are desirably moved by underlying vapor pressure traversing the deck apertures 70.

It may occur that the deck section thickness is so great, or the specific deck material of composition is such, that the continuous hold-down 72 of FIG. 11 cannot be extruded as an integral member from the deck. Under either of the latter conditions, the strips which are cut from the deck are transversely cut in the center prior to a forming or extruding operation so as to provide opposed S-shaped hold-downs 73 such as are illustrated in FIG. 12.

The distal terminal end of each S-shaped hold-down 73 should overlie an adequate surface portion of the underlying valve 68, so that the valve member 68, even if rising in a nonuniform manner from the surface of the deck 56, will not be able to work its way loose from between the opposed hold-down portions 73.

Figure 10:
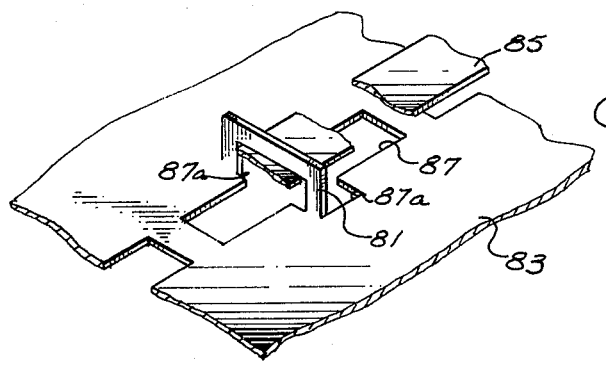
FIG. 10 is a fragmentary perpsective view of a modified hold-down construction formed integrally with the deck.

In FIG. 10, a modified integral hold-down 81 is illustrated which is extruded from deck portion 83, forming opposed aperture areas 87a which serve to enlarge the normal deck aperture 87. The hold-down 81 defines the vertical distance that the slat valve 85 may rise from the surface of supporting deck portion 83.

It is apparent from FIG. 9 that in the normal course of deck assembly, after the sections 54 and 56 are secured in place, the elongate slat-like valves 68 or 68a are threaded through the aligned hold-downs 72 so as to assume a position over the underlying aligned deck apertures or valve openings 70. Although the vertical movement of the slat-like valves relative to the deck sections is controlled by the hold-downs, means must also be provided for preventing endwise movement of the valves 68 or 68a relative to the hold-downs, so that the same may not work their way free from the hold-downs by endwise travel or travel parallel to the longitudinal axes of the valves.

To prevent such endwise movement of the slat-like valves, retaining means are secured to the deck surface which limit the endwise movement or longitudinal movement of the valves assuring their continuous disposition beneath the hold-down members integrally formed with the deck.

It will be noted from FIG. 9 that the valve-retaining means comprise at one end a vertical strip 74 which is welded at 75 to the deck surface. At the other end of the valves 68, a retaining means 76 of L-shaped cross section is removably secured to the upper surface of the deck section 56 by means of bolt members 78. Comparable retaining means 74a and 76a are employed with valves 68a on deck section 54. The valve-retaining means 76 may be readily removed from the deck surface to allow replacement of the valve members, if necessary.

It will be seen from the sectional views of FIGS. 11 through 14 that the valve members are normally much thinner and, therefore, more flexible than the usual deck sections themselves. As a result, it is possible that two retaining means, such as strip 74, may be employed which are both permanently secured in the upper surface of the deck sections. The affixed strips will allow the valve members to be inserted beneath or withdrawn beneath the hold-downs by virtue of the flexibility of the elongate valve members.

A third form of valve-retaining means comprises a vertical stop portion 80, illustrated in FIG. 13, which is extruded from the deck surface. The retaining means 80 may be readily formed from the deck surface during the same operation in which the hold-downs 72 are cut and extruded from the deck surface.

FIG. 14 illustrates a still further modified hold-down construction in which the flanges normally upwardly disposed relative to the deck surface, as in FIG. 9, are inverted and maintained in spaced-apart relationship. The flanges form an elongate inter-deck opening 82 which functions as a passageway through a deck and above which an elongate valve 68 may be disposed in the manner illustrated. The valve of FIG. 14 is retained in the opposed deck edge portions by means of the discrete S-shaped retaining means 84 which may be spot-welded, bolted, or otherwise secured to the upper surfaces of the adjacent edges of the illustrated deck sections 56a and 54a.

The illustrated slat-like valves provide efficiency and flexibility of operation. The slat-like valves may be readily formed by a sample stamping operation. Integral hold-downs 72 may be readily formed by simple cutting and extruding steps, and the various retaining means disposed at the opposed ends of the slat-like valve may be readily formed with and affixed to the deck surfaces in the manner previously described.

It is believed apparent that the novel integral hold-down which is formed with the deck surface, while in no way detracting from the efficiency of the contact apparatus operation, dispenses with the need for complicated securing operations necessary for securing valves to decks well known in the art. The integral valve construction may be employed with decks employing uncovered deck apertures 88 which improve the apparatus operating efficiency at low vapor pressures. Although the slat-like valves 68 and 68a illustrated have the longitudinal edges thereof arranged parallel to the normal direction of flow over the deck surfaces illustrated, it is apparent that the valves may be arranged at any angle, including right angles, to the direction of liquid flow over deck surfaces.

Two elongate valve constructions 68 and 68a have been illustrated for purposes of showing that the specific peripheral configuration of the slat-like valves is of no critical importance. It is conceivable that the valves may be curved or of other irregular configuration and still be retained to the deck surfaces by means of hold-downs formed integrally with the deck sections.

It has been made apparent, therefore, from the foregoing description that deck constructions have been provided in which the means retaining the valve closure members to an apertured deck are formed integrally therewith.

Simplicity in design is one of the main features of the constructions disclosed. Each of the deck modifications illustrated may be easily fabricated by simple blanking operations and subsequently assembled with closure members by simple bending operations. It is obvious that no securing means in addition to the valve and deck constructions disclosed need be used to affix each valve member to its respective deck portion. The ease with which one of the valves may be replaced is believed apparent.

In addition to simplicity in design and economy of manufacture, it is believed that the efficiency which the disclosed constructions will afford in operation has been made apparent. As previously mentioned, since negligible obstruction to liquid flow is presented by the valves and the valve-retaining portions, substantially no hydraulic gradient will exist across a deck surface on which they are disposed. This is so regardless of the angle between the flow direction and the longitudinal axes of the valves. In addition, the vapors impinging against the undersurfaces of the valves are distributed uniformly about the peripheries thereof. Still further, the vapor velocity must of necessity be substantially dissipated below the liquid level; consequently, coning and liquid entrainment are substantially completely eliminated.

It is believed apparent that the leg slots, holes or other apertures will be most advantageously employed where fluids having dirt or other entrained solid material therein are being treated, since the apertures will facilitate movement of the same across the deck. The apertures in the valves are to be obviously employed whenever increased vapor load is desired in an installation.

Self-evidently, the size of the deck or plate apertures and the therewith cooperating valves may vary widely, depending entirely on the size of the apparatus in which disposed. The material of deck and valve fabrication may be of any suitable kind which is not attacked by the gases or vapors which are to be treated in the exchange device. By way of example only, stainless steel or aluminum are suitable and readily available, but plastic materials may also be employed.

If desired, the provided check valves may be arranged on each deck in groups of varying weight, the members of each group being disposed in a predetermined configuration. Utilizing such arrangements, uniform vapor distribution through each deck is assured at varying vapor loads, and the distribution of rising vapors through each deck may be determined with accuracy for any vapor load.

In view of the many obvious modifications which may be made from an examination of the disclosure of the inventive concepts heretofore presented, it is intended that this invention be limited only by the scope of the appended claims.

We claim:

1. In contact apparatus of the type described in which rising fluid countercurrently engages a descending fluid, the combination comprising an apertured deck, valve means for at least some of said deck apertures liftable therefrom by fluid pressure exerted from beneath said deck, a plurality of retaining means for limiting the distance said valve means may move from said deck, each of said retaining means comprising an upwardly bent portion of said deck and thereby being integrally formed with said deck.

2. The contact apparatus as recited in claim 1 wherein said retaining means are of uniform length and extend normally from the deck with which integrally formed equal distances whereby said retaining means maintain said valve means in a substantially horizontal plane when said valve means are lifted from said deck and limited in movement by said retaining means.

3. The contact apparatus recited in claim 1 wherein said retaining means are of dissimilar length and extend normally from the deck with which integrally formed unequal distances whereby said retaining means maintain said valve means in a plane inclined to the deck surface when said valve means are lifted from said deck and limited in their movement therefrom by said retaining means.

4. In a process for forming a tray for use in a contact apparatus, the steps comprising stamping out portions of a deck so as to form discrete strips converging toward the center of an aperture formed in the deck, said strips being initially disposed in the plane of the deck, simultaneously shearing longitudinal edge portions of each of said strips from peripheral portions of said deck defining said aperture during said stamping step, bending said strips about axes disposed at the proximal ends of said strip furthest from the center of said aperture whereby said strips are disposed at substantially right angles to the plane of the deck, placing a valve means of sufficient area to be supported between the bent strips over said deck and aperture, and inwardly bending distal portions of said strips over said valve means and underlying deck aperture whereby said valve may not be disengaged from said deck but is retained thereto by said strips.

5. In contact apparatus of the type described in which rising fluid countercurrently engages a descending fluid, the combination comprising an apertured deck, valve means for at least some of the apertures liftable therefrom by fluid pressure exerted from beneath said deck, a plurality of retaining means for limiting the distance said valve means may move from said deck, each of said retaining means comprising an upwardly bent portion of said deck and thereby being integrally formed with said deck; said retaining means occupying a minute portion of the cross section of each of said apertures whereby said retaining means comprises insignificant obstructions to the rising fluid pressure as said fluid pressure passes through said apertures.

6. In contact apparatus of the type described, the combination comprising an apertured deck, valve means reciprocally movable over at least some of the deck apertures, peripheral portions of said deck defining said some apertures having spaced slots formed therein extending from the aperture periphery away from the aperture center, means for retaining said valve means to said deck comprising substantially vertically disposed leg means integrally formed with said deck and extending upwardly from the portion of each of said slots disposed furthest from the aperture center; the furthest slot portion comprising a juncture between said leg means and said deck; stop means for said valve means defining the upper end limit of each of the retaining means, said stop means inwardly projecting toward a vertical axis passing through the center of the underlying deck aperture, peripheral portions of said valve means resting on peripheral portions of said deck defining said some apertures when said valve means are in their lowermost position, small crack-like openings of said slots being disposed between the outer periphery of each of said valve means and said leg means when each of said valve means is in its lowermost position in overlying relation with said deck whereby vapors may bleed through said openings at low vapor loadings of said apparatus.

7. In an apparatus of the type described, the combination comprising an apertured deck, valve means reciprocally movable over at least some of the deck apertures; said valve means having outer peripheral portions supportably engageable in the lowermost position of valve means reciprocal movement over peripheral portions of said deck defining said apertures, means for retaining said valves in operative relationship with said deck comprising strips, each of said strips comprising an upwardly bent portion of said deck and thereby being integrally formed with said deck and formed from the original deck portions from which said apertures are formed, said strips being formed integrally with and extending upwardly from deck peripheral portions disposed at a greater distance from the centers of the apertures which they surround than the peripheral portions of the deck supporting said valve means, whereby said valve means may be supported by said deck within a periphery defined in part by said strips.

8. In contact apparatus of the type described in which rising fluid countercurrently engages a descending fluid, the combination comprising a deck having a plurality of apertures formed therein, at least some of said apertures being arranged in axial alignment, an elongate valve member simultaneously covering a plurality of deck apertures and supported on deck portions interposed between the covered apertures; spaced means extending above the level of said deck for limiting the distance each of said valves may be removed from the surface of said deck; said spaced means comprising spaced strips, each of said strips comprising an upwardly bent portion of said deck and thereby being formed integrally with said deck; said strips at least partially spanning the width of said elongate valve member.

9. The contact apparatus of claim 8 in which said strips comprise continuous metal bands deformed from the plane of said deck.

10. In contact apparatus of the type described, the combination comprising an apertured deck, at least some of the apertures having notches formed in spaced peripheral portions of said deck defining said some apertures, said notches including portions disposed outwardly on said deck from said deck peripheral portions defining said some apertures; valve means reciprocally movable relative to said peripheral portions of said deck defining said some apertures; said valve means being of such area as to lie within a periphery defined in part by the portions of said notches disposed farthest from the aperture partially encompassed thereby; retaining means extending from the farthest notch portions for limiting reciprocal movement of said valve means to predetermined distances from the deck surface when removed therefrom; said retaining means being formed integrally with said deck and initially comprising deck portions from which said apertures are formed.

11. The apparatus of claim 10 in which each of said retaining means comprises a narrow leg portion extending at substantially right angles to the surface of said deck and having a projecting stop portion disposed at the upper end limit thereof inwardly disposed toward a vertical axis passing through the center of the underlying aperture.

References Cited by the Examiner

UNITED STATES PATENTS

| 2,718,900 | 9/1955 | Nutter | 137—512.1 |
| 2,718,901 | 9/1955 | Nutter | 137—512.1 |
| 2,772,080 | 11/1956 | Huggins et al. | 261—114 |
| 3,087,232 | 4/1963 | Dow | 29—157.1 |
| 3,089,224 | 5/1963 | Grove | 29—157.1 |
| 3,143,582 | 8/1964 | Jones et al. | 261—114 |
| 3,146,280 | 8/1964 | Forgrieve | 261—114 |

FOREIGN PATENTS

| 1,237,299 | 6/1960 | France. |
| 39,479 | 3/1957 | Poland. |

HARRY B. THORNTON, *Primary Examiner.*

RONALD R. WEAVER, *Examiner.*